United States Patent
Wuidart

(10) Patent No.: US 8,296,576 B2
(45) Date of Patent: Oct. 23, 2012

(54) METHOD FOR SCRAMBLING THE CURRENT CONSUMPTION OF AN INTEGRATED CIRCUIT

(75) Inventor: Sylvie Wuidart, Pourrieres (FR)

(73) Assignee: STMicroelectronics SA, Montrouge (FR)

( * ) Notice: Subject to any disclaimer, the term of this patent is extended or adjusted under 35 U.S.C. 154(b) by 3292 days.

(21) Appl. No.: 10/388,324

(22) Filed: Mar. 12, 2003

(65) Prior Publication Data

US 2003/0219126 A1 Nov. 27, 2003

Related U.S. Application Data

(63) Continuation of application No. PCT/FR01/02796, filed on Sep. 10, 2001.

(30) Foreign Application Priority Data

Sep. 14, 2000 (FR) ...................... 00 11696

(51) Int. Cl.
*G06F 11/30* (2006.01)
*G06F 12/14* (2006.01)
*G06F 1/26* (2006.01)
*G06F 11/00* (2006.01)
*G08B 13/00* (2006.01)
*G08B 21/00* (2006.01)
*G08B 29/00* (2006.01)

(52) U.S. Cl. ........................................ 713/189; 726/36
(58) Field of Classification Search ............ 726/34, 726/36; 380/287; 713/189
See application file for complete search history.

(56) References Cited

U.S. PATENT DOCUMENTS

| | | | | |
|---|---|---|---|---|
| 6,278,783 B1 * | 8/2001 | Kocher et al. | ............... | 380/277 |
| 6,327,661 B1 * | 12/2001 | Kocher et al. | ............... | 713/193 |
| 6,419,159 B1 * | 7/2002 | Odinak | ............... | 235/492 |
| 6,507,913 B1 * | 1/2003 | Shamir | ............... | 726/36 |
| 6,510,518 B1 * | 1/2003 | Jaffe et al. | ............... | 713/168 |
| 6,698,662 B1 * | 3/2004 | Feyt et al. | ............... | 235/492 |
| 6,748,535 B1 * | 6/2004 | Ryan, Jr. et al. | ............... | 713/189 |
| 6,766,455 B1 * | 7/2004 | Ryan, Jr. | ............... | 713/189 |
| 7,073,072 B1 * | 7/2006 | Salle | ............... | 713/193 |

FOREIGN PATENT DOCUMENTS

| | | | |
|---|---|---|---|
| FR | 2776410 | | 9/1999 |
| WO | WO99/48239 | * | 9/1999 |
| WO | WO99/49416 | * | 9/1999 |
| WO | 00/42484 | | 7/2000 |

OTHER PUBLICATIONS

Kocher et al., Differential Power Analysis, 19th Annual International Cryptology Conference, Santa Barbara, CA, Aug. 15-19, 1999, Proceedings, Berlin: Springer, DE, 1999, pp. 388-397, XP000863414.

* cited by examiner

*Primary Examiner* — Christian LaForgia
(74) *Attorney, Agent, or Firm* — Allen, Dyer, Doppelt, Milbrath & Gilchrist, P.A.

(57) ABSTRACT

A method for scrambling current consumption of an integrated circuit, at least during execution of a confidential operation by the integrated circuit that includes reading confidential data stored therein and/or the calculation of an encryption code is provided. The charge pump is activated to generate current consumption fluctuations on the electrical power supply line of the integrated circuit, at an intensity great enough to mask the current consumption variations associated with the execution of the confidential operation.

23 Claims, 2 Drawing Sheets

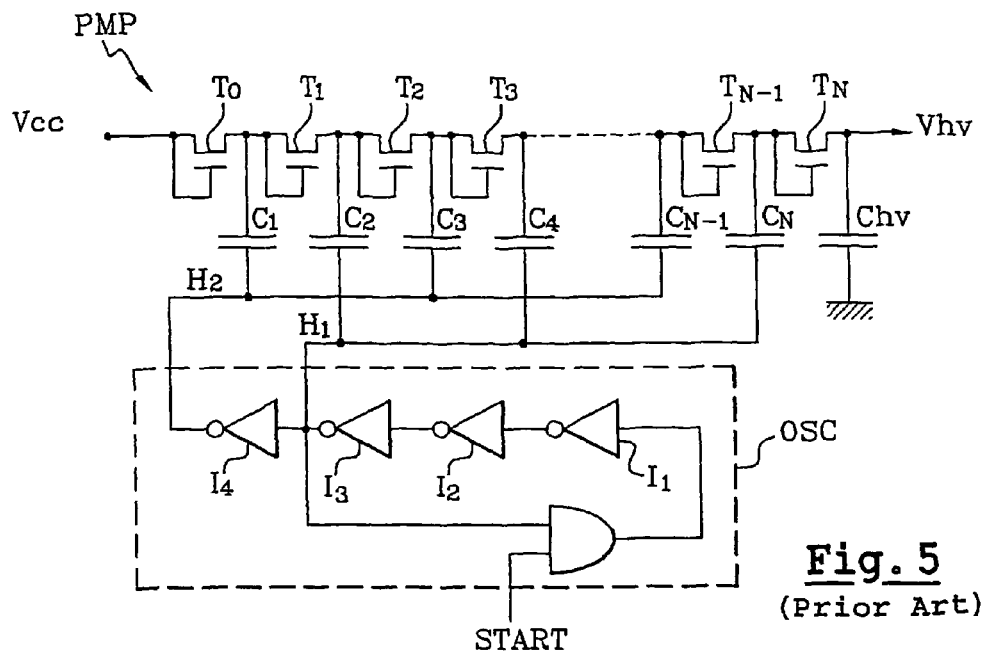
Fig. 5
(Prior Art)
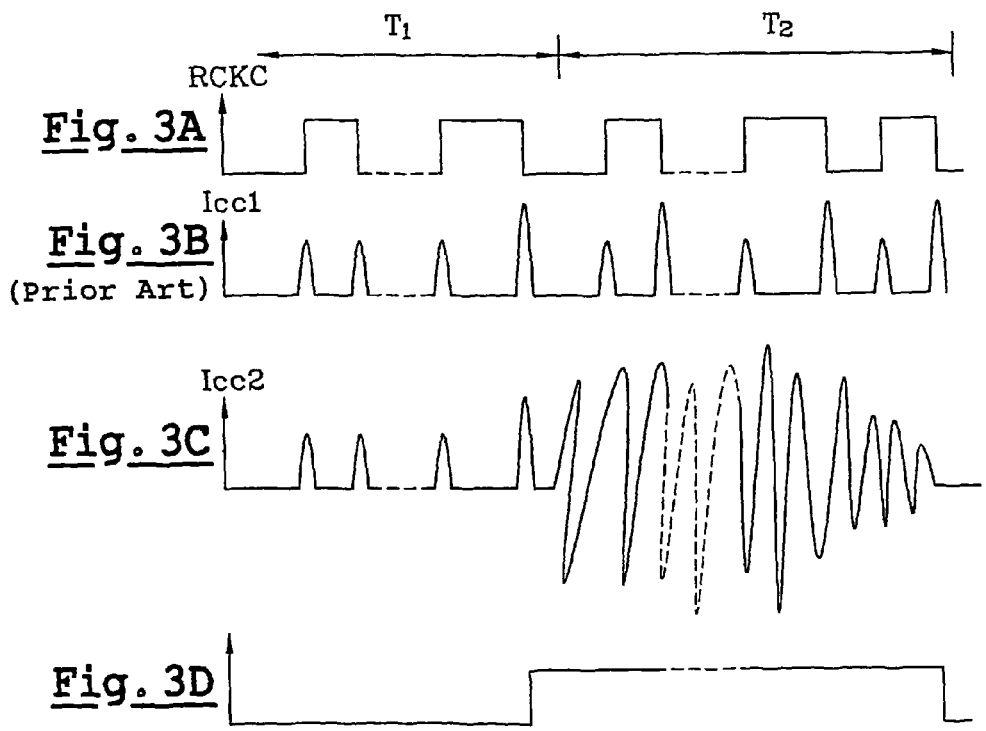
Fig. 3A
Fig. 3B
(Prior Art)
Fig. 3C
Fig. 3D

METHOD FOR SCRAMBLING THE CURRENT CONSUMPTION OF AN INTEGRATED CIRCUIT

RELATED APPLICATION

The present application is a continuation of International Application No. PCT/FR01/02796 filed on Sep. 10, 2001, the entire disclosure of which is incorporated herein by reference.

FIELD OF THE INVENTION

The present invention relates to the field of integrated circuits, and more particularly, to a method for scrambling current consumption of an integrated circuit, at least during execution by the integrated circuit of an operation requiring confidential data stored therein to be read. The present invention also relates to an integrated circuit comprising at least one memory in which confidential data are stored, a charge pump and calculation means for reading the confidential data.

BACKGROUND OF THE INVENTION

Typically, electronic transactions carried out using a smart card are secured by an authentication procedure of the card using an encryption algorithm. During this authentication procedure, the terminal used for the transaction sends a random code to the card. The smart card must answer the terminal by producing an authentication code, which is a transform of the random code, using the encryption algorithm. The terminal calculates the transform of the random code and compares the result obtained with the one sent back by the card. If the authentication code sent back by the card is valid, the transaction is enabled.

In the integrated circuit of a smart card, the encryption algorithm is generally executed by a hard-wired logic circuit, or encryption coprocessor, to which a secret key or encryption key is allocated and stored in a protected area of the integrated circuit's memory. It is essential to insure absolute protection of this secret key because the encryption algorithms used in the authentication procedures are known, and only the secret key can guarantee the inviolability of the authentication procedure.

In recent years, pirating techniques concerning secured integrated circuits have developed significantly and today sophisticated analysis methods are implemented by so-called current monitoring, i.e., based on the observation of the current consumed by the components of an integrated circuit during execution of confidential operations. To counter these pirating methods, different countermeasures have been provided, for example, by providing a random clock signal, using dummy codes, masking current consumption variations, etc. In particular, an anti-pirating method is disclosed in European Patent Application No. 500,461 which discloses resistors arranged parallel to the active elements of an integrated circuit and fed by a current generator. The current generator and the resistors insure a constant current consumption at the integrated circuit terminals, which masks the individual consumption of the active elements.

Conventional anti-pirating methods prove efficient to counter SPA-type analysis methods (Single Power Analysis). They are, however, insufficient to counter a recently discovered analysis method, called DPA analysis (Differential Power Analysis), which enables the secret key of an encryption circuit to be discovered by solely observing variations in the current consumed by the encryption circuit, without it being necessary to read the data circulating on the internal bus of the integrated circuit and to identify the memories being read.

In a more simplified manner, this method is based on a correlation of samples of the current consumed in connection with a mathematical model of the encryption circuit and hypotheses concerning the value of the secret key. The correlation allows the continuous part of the current consumed to be suppressed and consumption peaks to be updated, which reveals the operations carried out by the encryption circuit and the value of confidential data.

SUMMARY OF THE INVENTION

In view of the foregoing background, an object of the present invention is to provide a method for countering a DPA-type analysis, against which the masking of the current consumed using a source of power supply insuring a constant current consumption proves inefficient.

This and other objects, advantages and features in accordance with the present invention are provided by a method for scrambling the current consumption of an integrated circuit, at least during execution of a confidential operation by the integrated circuit comprising the reading of confidential data stored therein and/or the calculation of an encryption code. The method is characterized in that it includes the activation of a charge pump to generate current consumption fluctuations on the electric power supply line of the integrated circuit of an intensity great enough to mask the variations in current consumption associated with the execution of the confidential operation.

According to one embodiment, the method comprises causing a current leakage in the charge pump during execution of the confidential operation.

According to another embodiment, the current leakage is caused using a switch whose OFF or ON state varies according to the value of data loaded into a register.

According to another embodiment, the charge pump is also activated during data recording into an electrically erasable programmable read-only memory, in order to produce a high voltage for programming and/or erasing the memory.

The present invention also relates to an integrated circuit comprising at least one memory in which confidential data are stored, one charge pump and calculation means able to read the confidential data stored therein. The integrated circuit includes means for activating the charge pump at least during execution of a confidential operation comprising the reading of the confidential data and/or the calculation of an encryption code by encryption means.

According to one embodiment, the integrated circuit comprises means for causing a current leakage in the charge pump at least during execution of the confidential operation.

According to another embodiment, the means for causing a current leakage comprises a switch whose OFF or ON state varies according to data loaded into a register.

According to another embodiment, the integrated circuit comprises an electrically erasable programmable type memory, characterized in that the charge pump is also activated while data is being recorded in the memory, to produce a high voltage for programming and/or erasing the memory.

According to another embodiment, the integrated circuit is arranged on a portable support to form a smart card or any other equivalent portable electronic object.

BRIEF DESCRIPTION OF THE DRAWINGS

These objects, characteristics and advantages and other features of the present invention shall be presented in greater detail in the following description of the method of the present invention and of an integrated circuit according to the present invention, in connection with the following figures, in which:

FIGS. 3A, 3C and 3D illustrate the method of the present invention and represent electrical signals appearing in an integrated circuit according to the present invention, and FIG. 3B represents an electrical signal appearing in an integrated circuit according to the prior art;

FIG. 5 represents the structure of a charge pump according to the prior art.

DETAILED DESCRIPTION OF THE PREFERRED EMBODIMENTS

Figure 1:
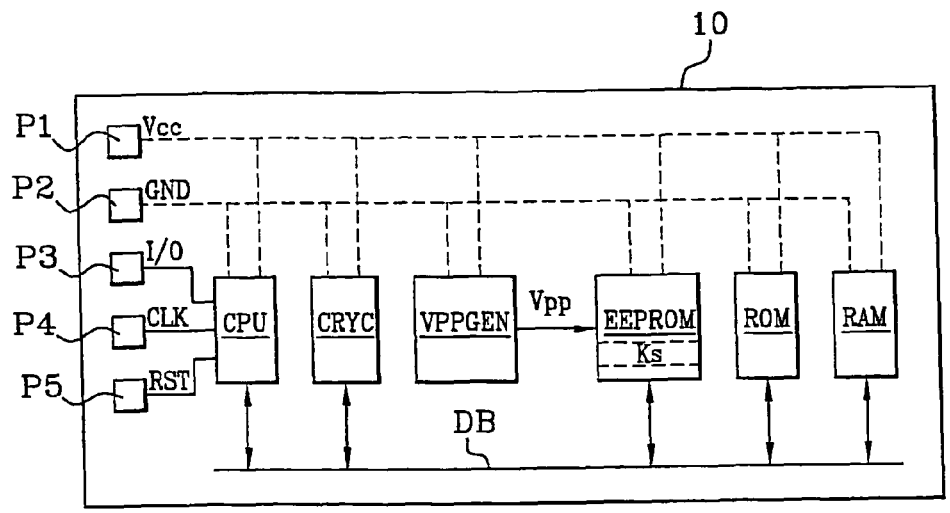
FIG. 1 represents, in block form, an example of a conventional integrated circuit architecture for smart cards according to the prior art.

FIG. 1 is a schematic representation of the conventional architecture of an integrated circuit 10 for smart cards, which is of the micro-controller type. The integrated circuit 10 includes contact pads P1 to P5, a central processing unit CPU, an encryption circuit CRYC, for example a 3DES circuit, a read-only memory ROM in which the operating system of the CPU unit is stored, a random access memory RAM to store temporary data, and an electrically erasable programmable read-only memory EEPROM to store one or more application programs.

The EEPROM memory also includes a protected area in which the secret key Ks of the encryption circuit CRYC is stored. The integrated circuit 10 also comprises a booster circuit VPPGEN including a charge pump for delivering a high voltage Vpp for programming and/or erasing the EEPROM memory when data must be recorded therein. The high voltage Vpp is conventionally on the order of 12 to 17 V for a supply voltage Vcc that is on the order of 3 to 5 V. The CPU unit, the circuit CRYC and the EEPROM, ROM and RAM memories are connected to a common data bus DB. The pad P1 is a supply pad receiving a supply voltage Vcc and the pad P2 is a ground pad receiving a ground potential GND. Pads P3 to P5 are for example input/output pads I/O, clock pads CLK and reset pads RST as stipulated in standard ISO 7816.

This integrated circuit 10 may not resist an attack carried out by DPA analysis, which is intended to determine the encryption key Ks stored in the protected area of the EEPROM memory. This attack can take place during an authentication procedure, when the CPU unit activates the encryption circuit CRYC so that the latter calculates the transform of a random code supplied by a terminal. During this operation, the secret encryption key Ks is read in the EEPROM memory and a measurement of the peaks of current consumed by the encryption circuit CRYC can enable, in combination with a mathematical model of the circuit CRYC and various hypotheses on the value of the secret key Ks, discovery of the secret key.

More particularly, this kind of DPA attack can take place during the secret key Ks reading by the encryption circuit CRYC (the secret key then being temporarily stored in a private register of the encryption circuit), or during encryption code calculation, or in a cumulated way, during execution of both the above-mentioned operations.

Figure 2:
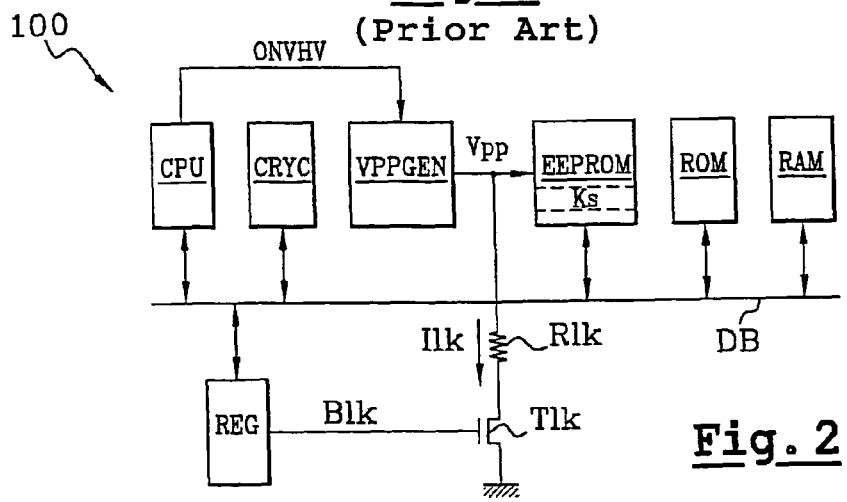
FIG. 2 illustrates implementation of a method according to the present invention in the integrated circuit of FIG. 1.

According to the method of the present invention, illustrated in FIG. 2, activation of the circuit CRYC is preceded by activation of the booster circuit VPPGEN charge pump, for example by an activation signal ONVHV delivered by the CPU unit. The activation of the booster circuit VPPGEN charge pump causes an important current consumption noise on the power supply line linking the pad P1 to the various elements of the integrated circuit (FIG. 1), and masks the consumption peaks due to the activity of the circuit CRYC, so that their synchronization by DPA analysis becomes very difficult.

Moreover, the necessary steps are preferably taken to cause a current leakage in the circuit VPPGEN in order to operate the charge pump at full speed. In this way, the noise generated by the pump is at its maximum level. This current leakage can be obtained by a switch Tlk connected to the output or to an internal node of the booster circuit by a resistor Rlk. The switch Tlk is a MOS transistor, for example, and the resistor Rlk is, for example, the drain-source resistor of the transistor Tlk. The gate of the transistor Tlk is controlled by a check bit Blk stored in a register REG. The check bit Blk is set to 1 after the activation of the charge pump, during scrambling periods, so that a leakage current Ilk crosses the resistor Rlk and the transistor Tlk.

The execution of a confidential operation thus comprises the following sequence according to the present invention: 1) activation of the booster circuit VPPGEN, 2) activation of the leakage (bit Blk is set to 1 in the register REG by the CPU unit), 3) execution of the confidential operation (confidential data reading and/or cryptographic calculation), 4) leakage deactivation (bit Blk is set to 0), and 5) deactivation of the booster circuit VPPGEN.

FIGS. 3A to 3D illustrate the impact of the method of the present invention on the current consumption of the integrated circuit. FIG. 3A represents a random clock signal RCLK generated in the integrated circuit 100 as the first scrambling means. FIG. 3B represents the current Icc1 consumed by the integrated circuit without the method of the present invention. FIG. 3C represents the current Icc2 consumed by the integrated circuit when the method of the present invention is used. FIG. 3D represents the leakage check bit Blk. On these figures, a period T1 can be distinguished, during which the CPU unit executes non-sensitive program sequences which do not involve confidential data, and a period T2 during which confidential data are handled. Period T2 is for example an activity period of the circuit CRYC.

On FIG. 3B, the current consumed Icc1 shows, during periods T1 and T2, consumption peaks synchronized with the leading and/or trailing edge of the random clock signal RCLK. During period T2, a report of those consumption peaks can enable a DPA analysis to be carried out for determining the value of the confidential data.

According to the method of the present invention, the charge pump is activated and the leakage check bit Blk is set to 1 (FIG. 3D) at the beginning of period T2 at the latest. As it can be seen by comparing FIGS. 3B and 3C, the consumption peaks (FIG. 3B) associated with confidential data reading and encryption code calculation are buried in substantial background noise (FIG. 3C) due to the consumption of the charge pump. This consumption displays a saw-tooth profile because of the very structure of a charge pump, which will be reviewed below.

Figure 4:
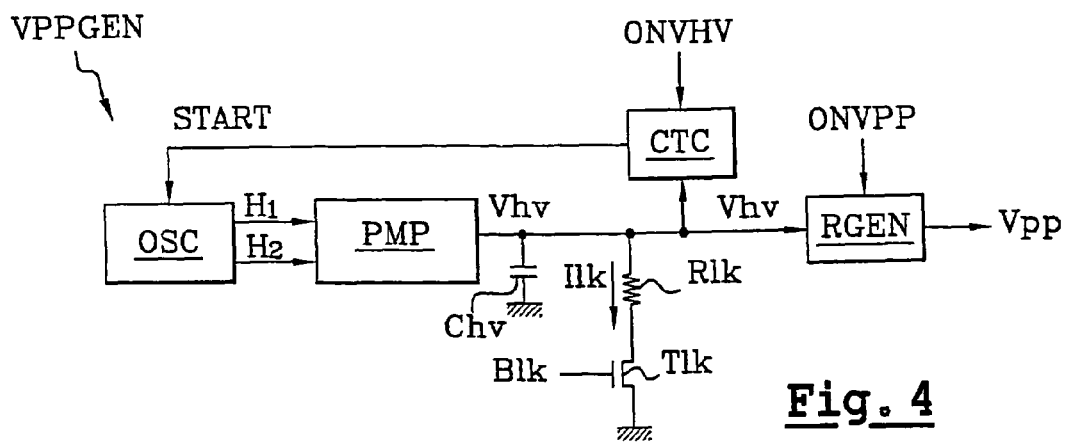
FIG. 4 represents, in block form, an embodiment of a booster circuit comprising a charge pump according to the present invention.

FIG. 4 represents an embodiment example of the booster circuit VPPGEN. The circuit VPPGEN comprises an oscillator OSC delivering two activation signals H1, H2 in opposite phase. The signals H1, H2 are applied to a charge pump PMP, the output of which delivers a high voltage Vhv. The high voltage Vhv is applied to the anode of a stabilization capacitor Chv and to the input of a ramp generator RGEN, the output of which delivers the voltage Vpp intended to be applied to the EEPROM memory. The leakage transistor Tlk is linked to the output of the charge pump, in parallel with the stabilization capacitor Chv.

The oscillator OSC is controlled by a signal START delivered by a circuit CTC which monitors the voltage Vhv. The circuit CTC activates the oscillator OSC by setting the signal START to 1 when the voltage Vhv is less than a predetermined nominal value, and deactivates the oscillator when the voltage Vhv is greater or equal to this value. The circuit CTC is controlled by the above-described signal ONVHV and the ramp generator RGEN is controlled by a signal ONVPP delivered by the CPU unit.

Two different modes of operation of the circuit VPPGEN can be distinguished: the programming and/or erasing mode of the EEPROM memory and the current consumption scrambling mode.

In the programming and/or erasing mode, the signals ONVHV and ONVPP are successively set to 1 and the leakage check bit Blk remains on 0. When the signal ONVHV changes to 1, the capacitor Chv is discharged and the circuit CTC activates the oscillator OSC to start the charge pump. The capacitor Chv charges until the voltage Vhv reaches its nominal voltage. When the signal ONVPP then changes to 1, the output of the generator RGEN progressively delivers the voltage Vpp in the form of a ramp followed by a plateau approximately equal to Vhv. As it is well known by those skilled in the art, the progressive application of the high voltage Vpp enables the EEPROM memory cells to be preserved and it increases their lifespan.

In the consumption scrambling mode, the signal ONVHV and the bit Blk are set to 1 and the signal ONVPP remains on 0, so that the high voltage is not applied to the EEPROM memory, which must remain available for reading. The leakage current Ilk prevents the voltage Vhv from reaching its nominal value and the circuit CTC maintains the oscillator OSC activated, so that the noise generated by the charge pump is permanent.

It is understood that variations on this embodiment of a booster circuit that can be used to implement the method of the present invention may be made. Thus, in some integrated circuits, the oscillator OSC is directly controlled by the signal ONVHV, and a voltage regulator (for example with a Zener diode) is arranged between the output of the charge pump PMP and the ramp generator RGEN. In these conditions, the charge pump is always active when the signal ONVHV is a 1 and it is not necessary to provide a leakage current to guarantee permanent activation of the latter. However, a leakage current can be provided to increase the current consumption in the charge pump and amplify the noise on the power supply line.

Moreover, it goes without saying that two charge pumps could be provided, one to implement the method of the present invention and the other to generate the voltage for erasing and/or programming an EEPROM memory.

For memory, FIG. 5 represents a conventional embodiment example of the charge pump PMP and of the oscillator OSC. The charge pump comprises a plurality of cascade-arranged capacitors, for example N capacitors C1 to CN. The anode of each capacitor C1, C2, . . . CN-1 is linked to the anode of the following capacitor C2, C3, . . . CN by diode-arranged transistors MOS T1 to TN-1 (gate connected to drain). At the charge pump input, the capacitor C1 receives the supply voltage Vcc by a diode-transistor T0.

At the end of the chain, a diode-transistor TN links the anode of the capacitor CN to the anode of the stabilization capacitor Chv, the cathode of which is grounded. The cathodes of even rank capacitors C2, C4, . . . receive the signal H1 delivered by the oscillator OSC and the cathodes of odd rank capacitors C1, C3, . . . receive the signal H2. Thus, alternatively, each odd rank capacitor C1, C3, . . . discharges in the following even rank capacitor C2, C4 . . . , and each even rank capacitor C2, C4, . . . discharges in the following odd rank capacitor C3, C5, . . . At the end of the chain, the capacitor CN discharges in the capacitor Chv at the terminals of which the high voltage Vhv can be found, equal to:

$$(1) Vhv = N \cdot VH - (VT1 + VT2 + VT3 + \ldots VTN)$$

VT1, VT2, . . . VTN are the threshold voltages of the diode-transistors T1 to TN and VH is the amplitude of signals H1, H2.

The oscillator OSC comprises three cascade-arranged NOT gates I1, I2, I3, the output of the gate I3 being brought back to the input of the gate I1 by an AND gate receiving the signal START on its other input. The signal H1 is split at the output of the gate I3 and the signal H2 is delivered by an inverter gate I4 receiving the signal Hi at input. When the signal START changes to 1, the AND gate becomes transparent, the oscillator OSC starts and the charge pump PMP is activated. Because of its structure, this charge pump produces an important consumption noise, which is used according to the present invention to scramble the current consumed during execution of confidential operations.

That which is claimed is:

1. A method for scrambling current consumption of an integrated circuit comprising a booster circuit comprising a charge pump, at least during execution of a confidential operation, the method comprising:
   reading confidential data stored in the integrated circuit during execution of the confidential operation; and
   activating the charge pump for providing a high voltage from a power supply voltage for causing a current leakage constrained within the booster circuit during execution of the confidential operation for generating current consumption fluctuations on a power supply line of the integrated circuit, the current consumption fluctuations having an intensity large enough to mask current consumption variations associated with the execution of the confidential operation.

2. A method according to claim 1, wherein the confidential operation includes calculating an encryption code for an encryption algorithm.

3. A method according to claim 1, wherein the integrated circuit comprises a register and a switch connected to the register; and wherein the current leakage is caused using the switch having an OFF and ON state that varies according to a value of data loaded into the register.

4. A method according to claim 1, wherein the integrated circuit comprises an electrically erasable programmable read-only memory; and wherein the method further comprises activating the charge pump for generating a voltage for the electrically erasable programmable read-only memory when data is recorded therein.

5. A method according to claim 1, wherein the integrated circuit is configured as a smart card.

6. A method for scrambling current consumption of an integrated circuit comprising a booster circuit comprising a charge pump and a memory connected to the booster circuit, at least during execution of a confidential operation, the method comprising:

reading confidential data stored in the memory during the execution of the confidential operation; and activating the charge pump for providing a high voltage from a power supply voltage for causing a current leakage within the booster circuit but not in the memory during the execution of the confidential operation for generating current consumption fluctuations having an intensity large enough to mask current consumption variations associated with the execution of the confidential operation.

7. A method according to claim 6, wherein the confidential operation includes calculating an encryption code for an encryption algorithm.

8. A method according to claim 6, wherein the integrated circuit comprises a register and a switch connected to the register; and wherein the current leakage is caused using the switch having an OFF and ON state that varies according to a value of data loaded into the register.

9. A method according to claim 6, wherein the memory comprises an electrically erasable programmable read-only memory; and wherein the method further comprises activating the charge pump for generating a voltage for the electrically erasable programmable read-only memory when data is recorded therein.

10. A method according to claim 6, wherein the integrated circuit is configured as a smart card.

11. An integrated circuit comprising:
at least one memory for storing confidential data;
a booster circuit comprising at least one charge pump connected to said at least one memory;
calculation means connected to said at least one memory for reading the confidential data; and
activation means for activating said at least one charge pump for providing a high voltage from a power supply voltage for causing a current leakage within said booster circuit but not said at least one memory during execution of a confidential operation for generating current consumption fluctuations having an intensity large enough to mask current consumption variations associated with the execution of the confidential operation comprising reading the stored confidential data.

12. An integrated circuit according to claim 11, wherein the confidential operation comprises calculating an encryption code using said calculation means.

13. An integrated circuit according to claim 11, wherein said calculation means comprises an encryption circuit.

14. An integrated circuit according to claim 11, wherein said activation means comprises a switch having an OFF and ON state that varies according to data loaded into a register connected thereto.

15. An integrated circuit according to claim 11, wherein said at least one memory comprises an electrically erasable programmable read-only memory; and wherein said charge pump is activated for generating a voltage for said electrically erasable programmable read-only memory when data is recorded therein.

16. An integrated circuit according to claim 11, wherein said at least one memory, said at least one charge pump, said calculation means and said activation means are configured to form a smart card.

17. An integrated circuit comprising:
at least one memory for storing confidential data;
a booster circuit comprising at least one charge pump connected to said at least one memory;
an encryption circuit connected to said at least one memory for reading the confidential data; and
a control unit for activating said at least one charge pump for providing a high voltage from a power supply voltage for causing a current leakage within said booster circuit but not said at least one memory during execution of a confidential operation comprising reading of the stored confidential data.

18. An integrated circuit according to claim 17, wherein said control unit causes said charge pump to generate consumption fluctuations having an intensity large enough to mask current consumption variations associated with the execution of the confidential operation.

19. An integrated circuit according to claim 17, wherein the confidential operation further comprises calculating an encryption code using said encryption circuit.

20. An integrated circuit according to claim 17, wherein said control unit comprises a switch having an OFF and ON state that varies according to data loaded into a register connected thereto.

21. An integrated circuit according to claim 17, wherein said at least one memory comprises an electrically erasable programmable read-only memory; and wherein said charge pump is activated for generating a voltage for said electrically erasable programmable read-only memory when data is recorded therein.

22. An integrated circuit according to claim 17, wherein said at least one memory, said at least one charge pump, said encryption circuit and said control unit are configured to form a smart card.

23. An integrated circuit according to claim 17, wherein said control unit comprises a central processing unit.

* * * * *